Jan. 3, 1933.           O. C. RALSTON ET AL           1,892,999
                     PROCESS FOR RECOVERING SULPHUR
                           Filed Sept. 25, 1929
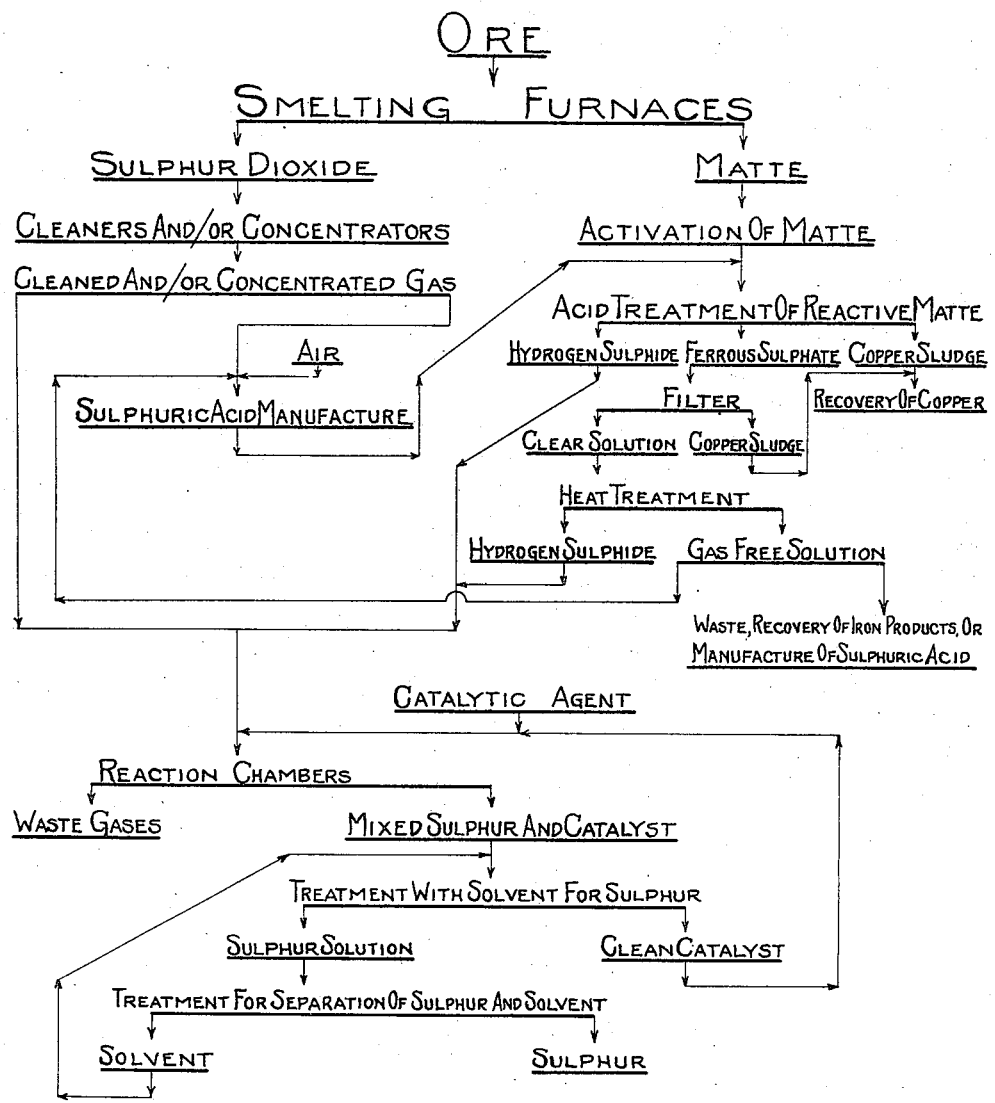
INVENTORS
OLIVER C. RALSTON
KENNETH M. BAUM
BY
Pennie, Davis, Marvin & Edmonds
ATTORNEYS Patented Jan. 3, 1933

1,892,999

UNITED STATES PATENT OFFICE

OLIVER C. RALSTON AND KENNETH M. BAUM, OF CLARKDALE, ARIZONA, ASSIGNORS TO UNITED VERDE COPPER COMPANY, OF CLARKDALE, ARIZONA, A CORPORATION OF DELAWARE

PROCESS FOR RECOVERING SULPHUR

Application filed September 25, 1929. Serial No. 395,178.

This invention relates to the recovery of sulphur and has for an object the provision of an improved process for recovering elemental sulphur from sulphur-bearing compounds. More particularly the invention contemplates the provision of an improved process for recovering sulphur from pyrites, pyritic copper ore, matte and the like.

According to some present practices in the treatment of sulphide ores, the sulphide minerals are smelted and reduced and otherwise treated for the purpose of obtaining metals. The sulphur contained in the minerals is converted to sulphur dioxide together with some sulphur trioxide. Large amounts of these compounds in the form of gases are generally wasted by permitting them to pass into the atmosphere. Such gases constitute a menace to plant life in the immediate vicinity of the smelting furnaces. Furthermore, the wasting of such gases constitutes a waste of one of the valuable elements of the ore.

The present invention contemplates the provision of a process by means of which a large proportion of the sulphur contained in commercial sulphide ores may be recovered in the form of elemental sulphur, with a resultant saving of a valuable element of such ores, and a reduction of the menace to plant life of gases evolved during smelting operations.

The heretofore customary processes for recovering elemental sulphur from sulphide ores generally require the use of carbonaceous fuels or other expensive raw materials, and, consequently, such methods are not commercially feasible. The process of this invention is adapted to produce elemental sulphur from ores, such, for example, as copper sulphide ores, with the use of very little extra fuel and no extraneous raw materials by utilizing intermediate metallurgical products made available during normal operations.

According to the process of the present invention one of the sulphur-bearing intermediate products of a usual smelting process is treated to produce hydrogen sulphide which is caused to react with sulphur dioxide which is also formed during the normal smelting operations. An improved catalyst is provided for promoting the reaction between the hydrogen sulphide and sulphur dioxide. In certain instances, the normal smelting operations are so controlled as to produce a product which facilitates the carrying out of the process for recovering elemental sulphur.

The sulphide ore such, for example, as a copper ore or a copper-zinc ore, may be given a preliminary treatment for the purpose of concentrating the minerals when necessary. The minerals may then be subjected to the usual preliminary roasting and smelting operations with the resultant formation of matte and slag and the evolution of sulphur dioxide gas.

The matte is subjected to a suitable treatment for the incorporation therein of a quantity of elemental or free iron, the purpose of the free iron being to activate the matte for subsequent treatment with acid. The amount of free iron may vary, but an amount equal to at least two per cent by weight of the matte will insure a speedy reaction of the matte with a mineral acid.

The activated matte is allowed to cool and solidify and it is then crushed to a size which will permit intimate contact of the sulphides with an acid solution. The crushed or ground matte is treated with a dilute mineral acid to generate hydrogen sulphide gas.

The acid used for the treatment of the matte may be obtained from any suitable source. Sulphuric acid which can be produced relatively cheaply at the usual smelter treating sulphide ores is a convenient reagent. During the treatment of the matte with sulphuric acid, ferrous sulphate is formed, and this product may be used with air and sulphur dioxide from one of the smelting steps to produce additional sulphuric acid. The sulphuric acid may be produced from the sulphur dioxide gases of the smelting operations by any of the commercial processes, such, for example, as the chamber or contact processes. The ferrous sulphate produced may also be heated to produce sulphur trioxide which may be used in forming sulphuric acid.

The hydrogen sulphide produced is combined with sulphur dioxide from the smelting operations to produce elemental sulphur. The reaction proceeds most advantageously in the presence of a catalyst. Activated charcoal, natural and artificial zeolites, and mixtures of activated charcoal and artificial zeolite or silica gel are suitable catalysts.

The elemental sulphur precipitates on the catalyst and the mixture of sulphur and catalyst is treated to effect a separation. Several methods of treatment are available, among which are the following:—

(1) The mixture may be leached with ammonium sulphide to dissolve the sulphur, and the resultant solution may be heated to cause precipitation of the sulphur;

(2) The mixture may be leached with live steam or superheated water to melt the sulphur and produce a mixture of water and molten sulphur from which the molten sulphur will readily separate; or (3) The mixture may be treated with commercial ortho-dichlorobenzene at an elevated temperature to dissolve the sulphur, the sulphur being precipitated by cooling the resulting solution.

When solvents are used, the $SO_2$ and $H_2S$ gas need not be so carefully purified of dust, soot and other substances which discolor sulphur or render it impure.

The invention will be better understood from a consideration of the following description in conjunction with the accompanying flowsheet in which is illustrated a complete process which may be carried out in accordance with the invention.

Matte obtained as a result of the smelting of a copper sulphide ore or a copper-zinc sulphide ore and containing a substantial amount of iron sulphide and other iron compounds is subjected to the action of a reducing agent for the purpose of reducing a portion of the iron compounds present to form free iron. In this connection, it might be noted that free iron might be added as such to a molten matte bath, but, in cases in which it has been found advisable to subject the matte to the action of reducing agents to separate slag and matte or to effect the removal of another component such as zinc, it is advisable to continue the reducing operation until the desired amount of free iron has been produced.

In the absence of free iron, matte reacts very slowly with acid, but the presence of free iron in an amount equivalent to about two per cent or more by weight causes a rapid reaction. The exact minimum percentage of metallic iron required in order that the reaction may proceed rapidly is unknown to us owing to the fact that available analytical methods are imperfect.

The matte which has been activated by the incorporation of free iron in a molten bath is cooled and solidified and subsequently crushed sufficiently that the major portion thereof passes a 10-mesh standard screen (Tyler series, 1.65 mm. rectangular openings). A primary crusher and a single set of rolls provide suitable grinding facilities.

The crushed or finely divided activated matte is subjected to the action of a dilute solution of a suitable acid, such as sulphuric acid, in any suitably enclosed reaction chamber. A solution containing about twelve per cent by weight of sulphuric acid is a suitable reagent. The sulphuric acid reacts with the iron sulphide contained in the matte to produce hydrogen sulphide and ferrous sulphate according to the following reaction:—

$$H_2SO_4 + FeS = H_2S + FeSO_4$$

The hydrogen sulphide is collected as evolved for subsequent treatment. The ferrous sulphate remains in solution in the reaction chamber and it may be separated, and recovered for use if desired, by decantation.

While the sulphuric acid employed may be obtained from any suitable source, it is desirable, if possible, to utilize the normal waste products of the smelting and other plant operations for its production. The sulphuric acid required may be obtained by treating sulphur dioxide gas resulting from the smelting operations in a chamber or contact process, or some of the ferrous sulphate produced in treating the activated matte may be used with air and sulphur dioxide from a smelting operation to produce the required amount of sulphuric acid. The ferrous sulphate provides a source from which sulphur trioxide gas may be obtained for producing sulphuric acid of any desired strength.

The process involving the use of ferrous sulphate, air, and sulphur dioxide for producing sulphuric acid may be used advantageously in carrying out a complete process in accordance with the present invention. A plentiful supply of sulphur dioxide is available from the smelting operations, and ferrous sulphate for use as a catalyst may be obtained from the treatment of the activated matte with sulphuric acid. Furthermore, this process is capable of producing acid containing ten to twelve per cent $H_2SO_4$ at a relatively low cost, and acid of this concentration is entirely suitable for treating the activated matte. In addition, since iron sulphate is a product resulting from the acid treatment of the activated matte, the acid may be used as produced without removing the iron sulphate catalyst. The process is capable of utilizing gases of low sulphur dioxide content to produce acid.

The acid treatment of the activated matte serves to concentrate the copper and thus eliminates an important portion of the treatment ordinarily required for the recovery of copper from matte. Thus, substantially all of the iron sulphide of the matte is converted to iron sulphate which may be removed by decantation, while some copper sulphide is also undoubtedly reduced through the action of the acid on the free iron according to the following formulæ:—

$$H_2SO_4 + Fe = H_2 + FeSO_4$$
$$CuS + H_2 = Cu + H_2S$$

The sludge remaining after the leaching of the acid treated matte for the removal of iron sulphate will consist largely of free copper, cupric sulphide, and cuprous sulphide, and it may have a copper content as high as seventy per cent or higher.

The ferrous sulphate solution obtained from the acid treatment of the matte and from leaching or washing the matte residue is heated or blown with air to effect the removal of any dissolved hydrogen sulphide, and filtered to separate the dissolved ferrous sulphate and any suspended copper sludge.

The gas free and clarified ferrous sulphate solution may be wasted, or evaporated in any desired manner to produce crystallized ferrous sulphate which may be marketed as such, or dried and heated to produce fuming sulphuric acid, sulphur dioxide, and ferric oxide pigments or other products by known methods. Wasting of the ferrous sulphate solution involves a waste of about forty per cent of the original sulphur of the smelter charge, and only about sixty per cent can be recovered as elemental sulphur from the reaction of hydrogen sulphide with sulphur dioxide. A ferrous sulphate decomposition furnace may be operated in conjunction with the sulphuric acid plant to provide for more flexible control of the process. Utilization of gases produced in such a furnace for manufacturing sulphuric acid will make available for interaction with hydrogen sulphide some or all of the sulphur dioxide gases from the smelting furnace otherwise required for the production of sulphuric acid, and/or will permit more sulphur to be left in the matte for the generation of hydrogen sulphide.

The hydrogen sulphide obtained as a result of the acid treatment of the activated matte is mixed with sulphur dioxide obtained from a smelting step and under the proper conditions the two gases react to produce water and elemental sulphur according to the following equation:—

$$2H_2S + SO_2 = 2H_2O + 3S$$

The sulphur dioxide gas may be obtained from the roasting furnaces, converters, or other suitable places, but it is preferably obtained at a point where a gas containing at least five per cent sulphur dioxide is available. The sulphur dioxide gas may be washed and/or concentrated in any desired manner.

The reaction between the hydrogen sulphide and the sulphur dioxide proceeds slowly at atmospheric temperatures and the speed of the reaction may be increased by increasing the temperature without the use of a catalyst. However, in the presence of a suitable catalyst, the reaction proceeds rapidly at atmospheric temperatures with the generation of sufficient heat to vaporize all water formed during the reaction.

Activated charcoal, natural zeolites and other hydrous double silicates containing aluminum or trivalent iron, and an alkali or alkaline earth metal, such as glauconite and bentonite, artificial zeolites, silica gel, and mixtures of activated charcoal and artificial zeolites or silica gel promote the reaction between hydrogen sulphide and sulphur dioxide. Activated charcoal can only be used effectively and without being consumed in the absence of free oxygen. The remaining catalysts are effective whether or not free oxygen is present in the gas mixture.

The activated charcoal used is preferably of the type which has been formed from the treatment of wood, lignite or coal at a low temperature (preferably below 600° C.) until removal of the volatile matter has been effected, and subsequently treated with air or steam at an elevated temperature.

The combinations of charcoal and artificial zeolite are preferably formed by first mixing the charcoal with one of the constituents of the zeolite, pouring the other constituent into the mixture thus formed and permitting the resultant product to gel so that a gel forms in the pores and over the surfaces of the charcoal particles. In this manner a product in which the charcoal is widely dispersed throughout the mass may be formed. The gel is dried at a low temperature before being used.

The mixture of silica gel and charcoal may be formed in a similar manner.

The amount of charcoal used may be varied to any desired extent. The catalysts produced by forming artificial zeolite or silica gel in the pores and over the surface of the charcoal are more effective than any of the components alone. In practice, mixtures containing about two parts by weight of charcoal and one part by weight of gel will be found to be very satisfactory.

The catalyst is preferably used in granulated form. A mixture of hydrogen sulphide and sulphur dioxide is passed through a bed of granulated catalyst of any desired thickness, the rate of flow of gases being determined by the area and thickness of the bed of catalyst. The reaction between the two gases takes place immediately and elemental sulphur is deposited on the catalyst. As sulphur is deposited the activity of the catalyst decreases gradually to the point at which it is inefficient. The gases are preferably passed through at least two catalyst beds in series and other beds are kept available at all times for insertion in series to replace inactive beds.

When a catalyst bed becomes inactive as a result of the deposition of sulphur thereon, the mixture of sulphur and catalyst is treated for the extraction of sulphur. Several extraction methods are available.

The mixture may be leached with ammonium sulphide at atmospheric temperatures to obtain a solution of sulphur in ammonium sulphide. The resulting solution is boiled and the distillate condensed. Boiling liberates hydrogen sulphide and ammonia gas which recombine in the condensate to form ammonium sulphide. The sulphur is deposited in the vat or still used for boiling.

After extraction of the sulphur has been substantially completed, the catalyst is washed with ammonium sulphide and subsequently treated with live steam to remove all ammonium sulphide liquor.

The sulphur liberated during the boiling of the ammonium sulphide solution will be found mixed with water and this mixture is preferably heated in a closed chamber under pressure with live steam to a temperature above the melting point of sulphur. The molten sulphur may be tapped from the bottom of the heating chamber, and cast in suitable forms for marketing.

The mixture of sulphur and catalyst may be treated with live steam or superheated water at a temperature above the melting point of sulphur to effect a separation. This method is not as satisfactory as a method involving extraction by means of a solvent. Complete separation requires much longer treatment than in the case of the use of a solvent.

Probably the most effective method of separating sulphur and the particular catalysts of the present invention is one involving the use of ortho-dichlorobenzene. According to this method, the mixture of catalyst and sulphur is treated with commercial ortho-dichlorobenzene at a temperature of about 110° C. until a saturated solution is formed. The solution is withdrawn and cooled to atmospheric temperature with the resultant precipitation of about ninety-eight per cent of its sulphur content. The cooled solution is then ready to be used again as a solvent.

The precipitated sulphur is heated and melted and cast into any desired forms. Any solvent contained in the precipitated sulphur may be recovered during the heating operation, or the precipitate may be treated with live steam to recover the sulphur. The catalyst is also preferably treated with live steam to remove any solvent remaining therein.

While pure ortho-dichlorobenzene is a satisfactory solvent, it is relatively expensive, and it is, therefore, advisable to use the commercial product which contains some of the para compound and possibly some of the meta compound together with some monochlorobenzene and higher chlorine derivatives. This mixture is a better commercial solvent than the pure compound.

Owing to the fact that gaseous raw materials are used, the sulphur product obtained in carrying out the process of the invention is of great purity.

We claim:

1. The method of recovering sulphur which comprises subjecting hydrogen sulphide to the action of sulphur dioxide in the presence of a hydrous double silicate containing aluminum or trivalent iron and an alkali or alkaline earth metal.

2. The method of recovering sulphur which comprises subjecting hydrogen sulphide to the action of sulphur dioxide in the presence of a zeolite.

3. The method of recovering sulphur which comprises subjecting hydrogen sulphide to the action of sulphur dioxide in the presence of an artificial zeolite.

4. The method of recovering sulphur which comprises subjecting hydrogen sulphide to the action of sulphur dioxide in the presence of a catalyst containing artificial zeolite.

5. The method of recovering sulphur from hydrogen sulphide gas and sulphur dioxide gas which comprises subjecting a mixture of the two gases to the action of a catalyst containing artificial zeolite.

6. The method of recovering sulphur from ores containing sulphides of iron and copper which comprises treating the ore to form sulphur dioxide and matte, treating the matte to form hydrogen sulphide, and subjecting the hydrogen sulphide to the action of the sulphur dioxide in the presence of a catalyst containing artificial zeolite.

7. The method of recovering sulphur from ores containing sulphides of iron and copper which comprises treating the matte to form hydrogen sulphide, and subjecting the hydrogen sulphide to the action of the sulphur dioxide in the presence of artificial zeolite.

8. The method of recovering sulphur from ores containing sulphides of iron and copper which comprises treating the ore to form sulphur dioxide and matte, treating the matte to form hydrogen sulphide, subjecting the hydrogen sulphide to the action of the sulphur dioxide in the presence of a zeolite to produce a mixture containing the catalyst and elemental sulphur, and treating the mixture with a solvent for sulphur.

9. The method of recovering sulphur from ores containing sulphides of iron and copper which comprises treating the ore to form sulphur dioxide and matte, treating the matte with acid to form hydrogen sulphide, subjecting the hydrogen sulphide to the action of the sulphur dioxide in the presence of a catalyst to produce a mixture containing the catalyst and elemental sulphur, and treating the mixture with ortho-dichlorobenzene to produce a sulphur solution.

10. The method of recovering sulphur from ores containing sulphides of iron and copper which comprises smelting the ore to produce sulphur dioxide and matte, incorporating free iron in the matte, treating the resulting matte product with acid to produce hydrogen sulphide, and subjecting the hydrogen sulphide to the action of the sulphur dioxide produced to form elemental sulphur.

11. The method of recovering sulphur from ores containing sulphides of iron and copper which comprises smelting the ore to produce sulphur dioxide and matte, incorporating free iron in the matte, treating the resulting matte product with acid to produce hydrogen sulphide, and subjecting the hydrogen sulphide to the action of the sulphur dioxide produced in the presence of a zeolite to form elemental sulphur.

12. In a process involving the treatment of a gaseous sulphur compound with an agent capable of reacting therewith to produce elemental sulphur, the improvement which comprises conducting the reaction in the presence of a hydrous double silicate containing aluminum or trivalent iron and an alkali or alkaline earth metal.

13. In a process involving the treatment of a gaseous sulphur compound with an agent capable of reacting therewith to produce elemental sulphur, the improvement which comprises conducting the reaction in the presence of a zeolite.

14. The method of recovering sulphur from sulphide minerals which comprises heating the minerals with access of air to form sulphur dioxide and matte, treating the matte with acid to produce hydrogen sulphide, and subjecting the hydrogen sulphide to the action of the sulphur dioxide to produce elemental sulphur.

15. The method of recovering sulphur from sulphide minerals which comprises heating the minerals with access of air to form sulphur dioxide and matte, incorporating metallic iron in the matte, treating the resulting matte product with acid to produce hydrogen sulphide, and subjecting the hydrogen sulphide to the action of the sulphur dioxide to produce elemental sulphur.

16. The method of recovering sulphur from sulphide minerals which comprises heating the minerals to form sulphur dioxide and molten matte, subjecting the matte to the action of a reducing agent to reduce one or more iron compounds contained therein and form metallic iron, treating the resulting matte product with acid to produce hydrogen sulphide, and subjecting the hydrogen sulphide to the action of the sulphur dioxide to produce elemental sulphur.

17. The method of recovering sulphur from sulphide minerals which comprises heating the minerals to form sulphur dioxide and molten matte, dissolving metallic iron in the molten matte, treating the resulting matte product with acid to produce hydrogen sulphide, and subjecting the hydrogen sulphide to the action of the sulphur dioxide to produce elemental sulphur.

18. The method of recovering sulphur which comprises subjecting sulphur dioxide to the action of a reducing agent in the presence of a hydrous double silicate containing aluminum or trivalent iron and an alkali or alkaline earth metal.

19. The method of recovering sulphur which comprises subjecting hydrogen sulphide to the action of an oxidizing agent in the presence of a hydrous double silicate containing aluminum or trivalent iron and an alkali or alkaline earth metal.

20. The method of recovering sulphur which comprises subjecting sulphur dioxide to the action of a reducing agent in the presence of a zeolite.

21. The method of recovering sulphur which comprises subjecting hydrogen sulphide to the action of an oxidizing agent in the presence of a zeolite.

In testimony whereof we affix our signatures.

OLIVER C. RALSTON.
KENNETH M. BAUM.